(12) United States Patent
Pai

(10) Patent No.: US 9,640,993 B2
(45) Date of Patent: May 2, 2017

(54) SYSTEM AND METHOD FOR MANAGING ENERGY CONSUMPTION

(71) Applicant: SCHNEIDER ELECTRIC INDUSTRIES SAS, Rueil Malmaison (FR)

(72) Inventor: Rohit Pai, Bangalore (IN)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 538 days.

(21) Appl. No.: 14/064,144

(22) Filed: Oct. 27, 2013

(65) Prior Publication Data

US 2014/0117758 A1 May 1, 2014

(30) Foreign Application Priority Data

Oct. 26, 2012 (IN) .......................... 4473/CHE/2012

(51) Int. Cl.
*H02J 3/14* (2006.01)
*G06Q 50/06* (2012.01)
*H02J 3/32* (2006.01)
*G06Q 10/06* (2012.01)

(52) U.S. Cl.
CPC .............. *H02J 3/14* (2013.01); *G06Q 10/06* (2013.01); *G06Q 50/06* (2013.01); *H02J 3/32* (2013.01); *H02J 2003/143* (2013.01); *H02J 2003/146* (2013.01); *Y02B 70/3225* (2013.01); *Y02B 70/3266* (2013.01); *Y04S 20/222* (2013.01); *Y04S 20/224* (2013.01); *Y04S 20/242* (2013.01); *Y10T 307/391* (2015.04)

(58) Field of Classification Search
CPC combination set(s) only.
See application file for complete search history.

(56) References Cited

U.S. PATENT DOCUMENTS

| 5,430,430 | A | 7/1995 | Gilbert | |
|---|---|---|---|---|
| 7,752,145 | B2 | 7/2010 | Kelty | |
| 7,953,518 | B2 | 5/2011 | Kansal et al. | |
| 8,478,452 | B2 * | 7/2013 | Pratt | H01M 10/44 320/128 |
| 2011/0082598 | A1* | 4/2011 | Boretto | G06Q 10/06 700/291 |
| 2012/0109394 | A1 | 5/2012 | Takagi et al. | |

FOREIGN PATENT DOCUMENTS

| CA | 2469768 A1 * | 12/2005 | ............... H02J 3/32 |
|---|---|---|---|
| EP | 2302572 | 3/2011 | |

* cited by examiner

*Primary Examiner* — Jared Fureman
*Assistant Examiner* — Swarna N Chowdhuri
(74) *Attorney, Agent, or Firm* — Mark M. Friedman

(57) ABSTRACT

A control unit with data analyzer is connected to database and configured to receive user inputs such as time driven mode, supply driven mode and automatic mode and operate the system with respect to the selected mode, tariff opted and user input commands, and signals the storage unit to get charged from the input source or to supply power to all the lines or to the selected lines from storage unit. The control unit during the time when energy prices are less, signals to charge the storage unit and supplies power to all appliances through the input source and during the time when energy prices are more, signals to shut off the non critical loads and utilize the charged power from storage unit to selected lines.

20 Claims, 3 Drawing Sheets

SYSTEM AND METHOD FOR MANAGING ENERGY CONSUMPTION

FIELD OF INVENTION

The present invention relates to a system for managing energy consumption, and more particularly to a control system which dynamically switches the electrical power supplies with respect to the different time slabs and the tariff opted so as to efficiently manage the energy consumption and to minimize the electricity bill.

BACKGROUND OF THE INVENTION

Power supply vendors offer Time of Use (TOU) tariff plans where the electricity per unit price will vary depending on the time popularly known as peak, off peak and shoulder time slabs. Customers with advanced meters and time of use tariffs pay different amounts for their electricity over these three different time periods. Power prices are cheaper in the off peak period and the peak time prices vary from 5 to 10 times the off peak period prices depending on countries. The shoulder period which could constitute up to 51% of the time depending on the countries and the price during this time is varied in between the peak period and off peak period tariff.

Management of tariff schedules involves using information on tariff changes supplied directly or indirectly by the electric power distributor to control and monitor the switching on of certain appliances under the most favorable economic conditions to the user. The usual household energy management system can mainly perform the tasks such as switching off the appliances if no user exists and the standby power cutoff by which the standby power otherwise consumed by household appliances are cutoff.

The tariff schedule management is currently performed using a relay that is controlled by means of signals directly transmitted by the electric power distributor or locally controlled by a clock and situated close to the electricity meter which makes it possible to control the operation of a load depending on the availability of the so-called off-peak tariff. Since the use of "off-peak" tariff is advantageous for all appliances that consume large amounts of power such as washing machines, tumble driers, dishwashers, heating appliances etc., the current solution required to be improved efficiently to manage the power in order to reduce the electricity bill.

However, the energy saving by control of household electric appliances is not so great within the consumer entity employing the conventional household energy management system. To realize increased energy saving, it is necessary to actively collaborate in reducing energy consumption in peak hours and utilize off peak hours more efficiently. User has to pay heavy electricity price if the consumption during the peak hour is not controllable. The load during peak hour can be controlled either by changing the source of power consumption and/or by shutting down the non critical load, but doing it manual is risky, prone to errors and inconvenient.

Moreover, user has to remember the time slabs and has to manually program the usage of the power source, to manually shut the non critical loads during peak time, which is not convenient to operate. Further, lack of communication between inverter systems and the user, and communication failure between the grid and the user also become a big problem in regulating the power consumption. Sometimes the user may be away from the place where inverter is installed, resulting uncontrolled electricity distribution. User is always surprised when the electricity bills arrives due to uncontrolled electricity usage during peak time. Thus the conventional approach fails to efficiently regulate the electricity consumption, since the tariff changes are linked more directly to the supply and demand for power.

Accordingly, it is necessary to provide an improved system for managing the energy consumption which avoids the higher electricity prices and enables running the appliances in a cost effective manner. Therefore it is desirable to provide a system for managing energy consumption, which overcomes the disadvantages of the conventional power consumption control approaches and providing a system which dynamically switches the power supplies during different time slabs so as to minimize the electricity bill. It also helps to utilize the non-conventional source of energy more efficiently.

OBJECTIVE OF THE INVENTION

The main object of the present invention is to provide an improved system and method for managing the energy consumption, which overcomes the disadvantages of the conventional power consumption control approaches.

Another object of the present invention is to provide an improvement in energy consumption pattern without change in actual appliance usage pattern and to leverage the off-peak rates.

Another object of the present invention is to configure the appliances to run on utility power during off peak hours and to charge the storage unit, as per requirement.

Another object of the present invention is to bypass the partial load on storage unit during the peak hour and thereby considerably reducing the electricity bill.

Another object of the present invention is to dynamically switch the electrical power supplies with respect the different time slabs and the tariff opted.

Another object of the present invention is to enable the system with a manual override option through a user interface.

Another object of the present invention is to shut the non critical loads during peak hours in order to reduce consumption and electricity bill.

SUMMARY OF THE INVENTION

The present invention which achieves the objectives relates to a system for managing the energy consumption. The system dynamically switches the electrical power supplies with respect to the different time slabs and the tariff opted and efficiently manages the energy consumption to minimize the electricity bill. The energy consumption management system has a utility interface module configures the utility source i.e., power grid, to supply the electrical power through the distribution lines to the required appliances in required load ratings. A utility data line from the power grid provides data communication from the power grid to the system. A storage interface module is provided to interface the storage unit such as battery into the system. The storage unit is charged with the utility source and supplies power to the required lines as communicated. The storage interface module measures all the electrical parameters of the storage unit and controls the charging and discharging of the storage unit and the power flow from the storage unit to the loads lines in the system. An alternate power source interface module is also provided to interface the alternate power source like wind, solar, geothermal, etc., into the system.

A user interface module is provided to enter the inputs by the user. The user interface module has a touch screen and a wireless user interface for making the inputs to the system and enabling the user to monitor the various data with the system. Multiple distribution lines are provided within the system for different loads like light loads, heavy loads and non-critical loads. Separate distribution lines are provided to supply the electrical power to the system as communicated. The distribution lines are measured for electrical parameters in the lines and to enable control the power flow into the particular line in the system.

A control unit having a data analyzer is provided to manage and enable the control over the power distribution and utilization of the storage unit and regulating the power supply to the system. The control unit performs control action, data processing and monitoring of all the other modules. Database is provided for storage and retrieval of tariff information, operating modes, line configurations, storage information, user inputs and other system requirements. An event manager is configured with the system for registering the events and communicating said events to the user. The control unit is configured to receive inputs and operates with respect to the selected mode, tariff opted and user input commands, and signals the storage unit to get charged from the input source or to supply power to the all lines or to the selected lines from the storage unit. The data analyzer Forecasts the electricity bill and gives information about the time slabs when there is no communication between the grid and the system.

The control unit commands with respect to the selected mode, tariff opted and user input commands, and signals the storage unit to get charged from the input source or to supply power to the all lines or to the selected lines from the storage unit. The control unit during the time when energy prices are less, signals to charge the storage unit and supplies power to all appliances through the grid input source and during the time when energy prices are more signals to shut off the non critical loads and allows utilizing the charged power from storage unit to the critical lines.

The control unit receives the time slab information from the utility source and the selected mode from the user interface, and identifies the time slab where the electric price rate is in between the peak time and off-peak time, and signals to charge or discharge the storage unit based on the next time slab, available charge in the storage unit and the load condition in the lines.

The control unit during the off peak hour, signals to charge the storage and supplies power to all appliances through the grid input source and during peak hours, signals to shut off the non critical loads and allows to utilize the charge in the storage unit to the selected critical lines.

The energy management system according to the present invention dynamically switches the power supplies during different time slabs and the tariff opted, thus efficiently controlling the energy consumption and minimizing the electricity bill.

The present invention provides an improved energy consumption pattern without change in the actual appliance usage and leverages the application off-peak rates.

BRIEF DESCRIPTION OF DRAWINGS

Referring now to the below drawings wherein the showings are for the purpose of illustrating a preferred embodiment of the invention only, and not for the purpose of limiting the same.

DETAILED DESCRIPTION

Figure 1:
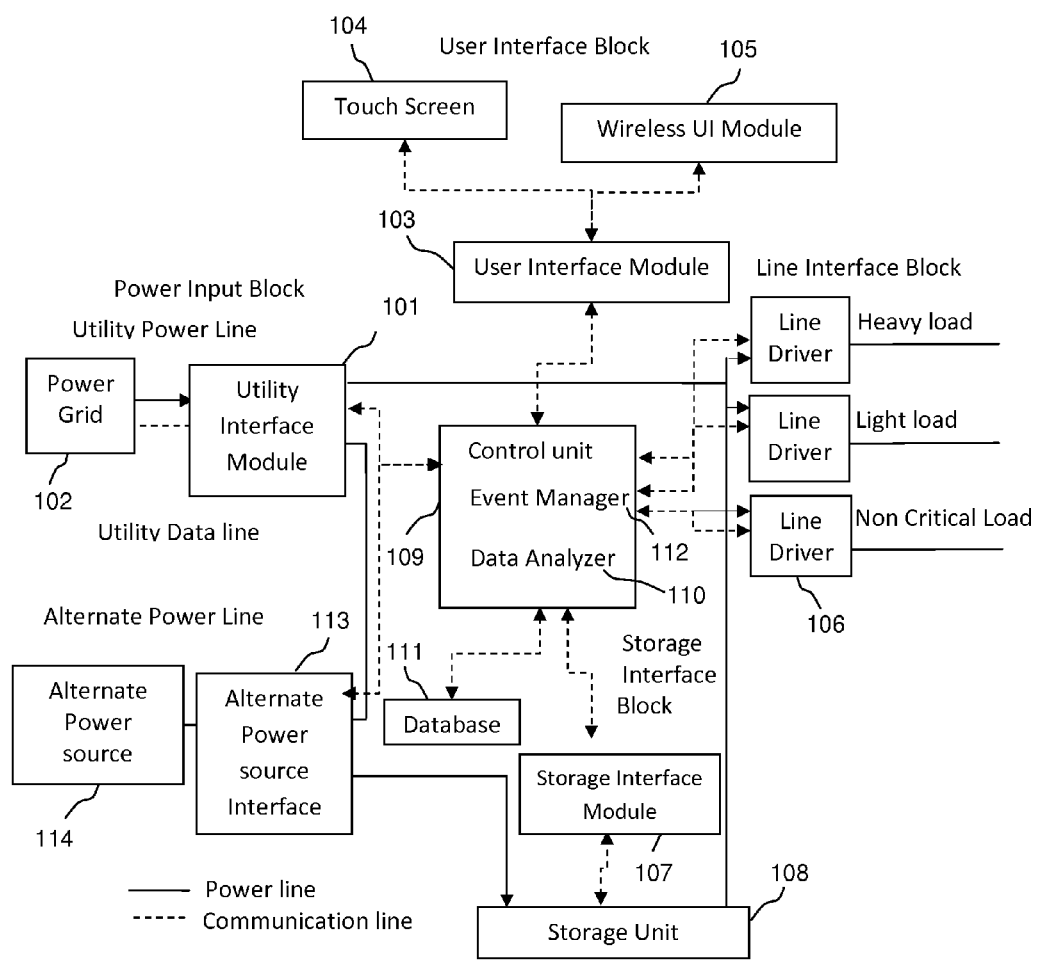
FIG. 1 represents an improved system for efficiently managing the energy consumption and minimizing the electricity bill, in accordance to the exemplary embodiment of the present invention.

The present invention relates to a system for managing energy consumption, which dynamically switches the electrical power supplies with respect to the different time slabs and the tariff opted so as to efficiently manage the energy consumption and to minimize the electricity bill. FIG. 1 represents an improved system for efficiently managing the energy consumption and minimizing the electricity bill, in accordance to the exemplary embodiment of the present invention. The energy consumption management system for the household or the buildings according to the present invention has a utility interface module (101) is provided to configure the utility source i.e. power grid (102) to supply the electrical power through the distribution lines to the required appliances in required load ratings and a utility data line from the power grid provides data communication from the power grid to the system. The utility interface module (101) receives power from the utility source and measures all its electrical parameters and the amount of power being consumed in terms of units. The Utility interface module (101) in the system controls the power flow from the utility source (102) to the line loads in the system.

A storage interface module (107) is provided to interface the storage unit (108) such as battery into the system. The storage unit (108) is a hardware device such as battery, capable of storing the energy and discharging the energy whenever needed. The storage unit (108) is configured through the storage interface module (107) with the energy management system such that the storage unit (108) gets charged with the utility source (102) and supplies power to the required lines as communicated. The storage interface module (107) measures all the electrical parameters of the storage unit (108) and controls the charging and discharging of the storage unit (108) and the power flow from the storage unit to the loads lines in the system.

An alternate power source interface module (113) is provided with the system to interface the alternate power source (114) like wind, solar, geothermal, etc., into the system. The storage unit (108) is arranged to get alternately charged through the available alternate sources of energy. The alternate power source interface module (113) measures the electrical parameters and power being consumed through the alternate power source (114) and enables charging of the storage unit (108) when power from the alternate source (114) is utilized for the system. The system has multiple distribution lines (106) for the different loads like light loads, heavy loads and non-critical loads. Separate distribution lines (106) are provided for heavy load, light load and non critical load to supply the electrical power to the system as communicated. The distribution lines (106) are measured for electrical parameters in the lines and to enable control the power flow into the particular line in the system.

A user interface module (103) is provided to enter the inputs by the user. The user interface module has a touch screen (104) and a wireless user interface (105) for making the inputs to the system and enabling the user to monitor the various data with the system. The user interface module (103) receives the user inputs and forwards it to the control unit (109) for processing the data and also forwards the message given by the control unit to the respective user module. The touch screen (104) displays the user notifications and allows the user to perform configuration of the system. The wireless module (105) provided with the user interface module (103) allows portable wireless user interface like mobile, tablet, laptop to connect to the system for configuration of the system.

A control unit (109) having a data analyzer (110) is provided to manage and enable the control over the power distribution and utilization of the storage unit (108) and regulated supplying power to the system. The control unit (109) is responsible for all the control action, data processing and monitoring of all the other modules. Database (111) is provided for storage and retrieval of tariff information, operating modes, line configurations, storage information, user inputs and other system requirements. Database (111) interfaced with the data analyzer (110) stores the configurations, stores events and maintains historical data. An event manager (112) is configured with the system for registering the events and communicating said events to the user. The event manager (112) is configured with the system for registering the events and communicating the events happened in the system to the user. The control unit (109) establishes communication to receive the power tariff information from the power grid (102) and to transfer data in between the control unit (109), storage unit (108), User input devices (104 & 105), database (111), data analyzer (110) and event manager (112).

The utility interface module (101) receives the tariff information through the data line and passes the information to the control unit (109). The control unit (109) is configured to receive the inputs on multiple modes such as time driven mode, supply driven mode and automatic mode. The control unit (109) is configured such that in time driven mode, the time slab information is entered by user input, in supply driven mode, time slab information is maintained based on the grid input. In automatic mode, the time slab information is made by dynamically reading the tariff information from the power grid (102) when there is communication between the power grid and system. Further, the control unit (109) automatically calculates tariff information and time slab information by analyzing with the historical data when no communication exists between the power grid and the control unit. The control unit also shifts to the automatic mode when there is no communication or communication failure in the system, such as grid communication and user interface. When there is no historical data present and no communication with the utility the system shifts back to the time driven mode.

Figure 2:
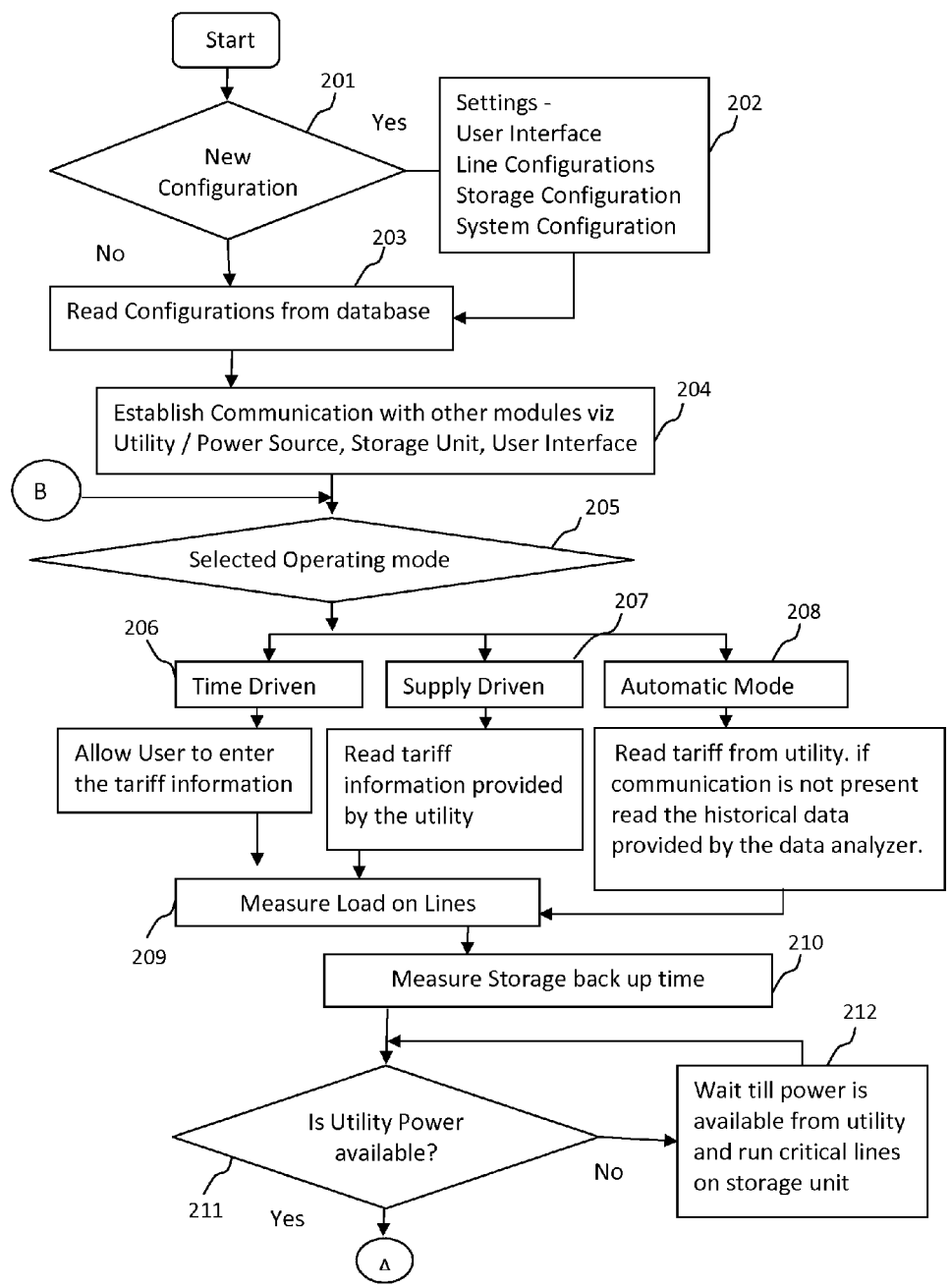
FIG. 2 shows a flow graph for efficiently managing the energy consumption, in accordance to the exemplary embodiment of the present invention.
Figure 3:
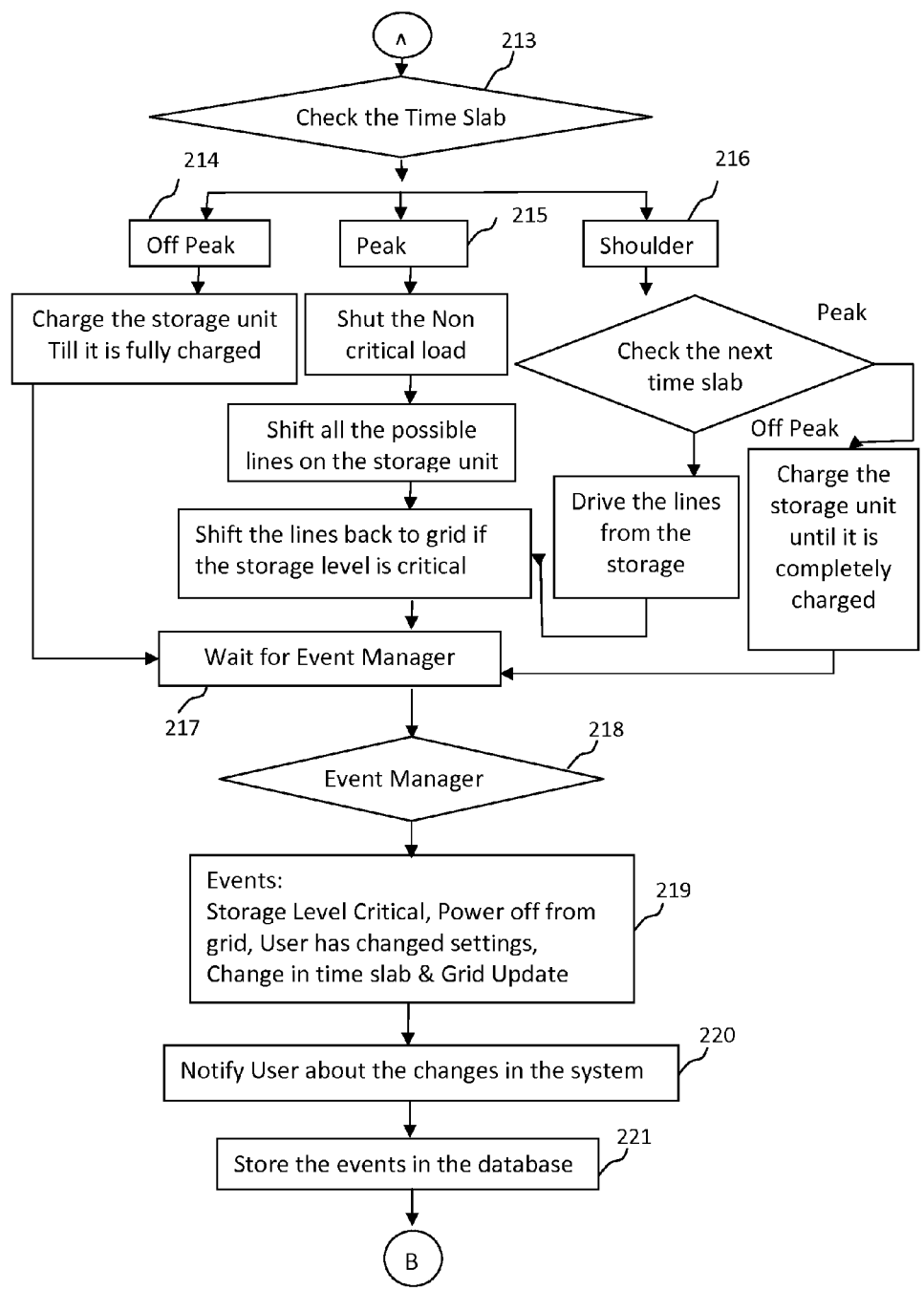
FIG. 3 shows the continuation of flow graph from FIG. 2, which describes the managing of energy consumption, in accordance to the exemplary embodiment of the present invention.

FIGS. 2 and 3 shows a flow graph for efficiently managing the energy consumption, in accordance to the exemplary embodiment of the present invention. The control unit checks for the configuration of the system (201) with user inputs so that the control unit performs control operations to efficiently manage the energy consumption. A user is allowed to set the system inputs (202) such as user interface, line configurations, storage configurations, system configurations and storage of settings in the database. The control unit checks for the new settings (202) from the user, and if there is no new setting available from the user, the control unit read (203) and installs the configuration from the database and proceeds for control operation. The control unit establishes communication (204) with other modules like utility interface module, user interface module, power source module, and storage interface module and storage device.

The user selects (205) an operating mode from one of the time driven mode, supply driven mode and automatic mode, and inputs the selection to the control unit through the by user interface module. In time driven mode (206), the system allows the user to enter the tariff information for the power consumption as required by the user and in the supply driven mode (207), the system reads the tariff information for the power consumption provided by the utility i.e. power grid. In automatic mode (208), the system reads the tariff information from the utility, and if there is no communication between the system and utility source, the control unit read the tariff information by the analyzing the historical data provided by the data analyzer.

The control unit shifts to automatic mode when there is a communication failure in the system, such as grid communication and user interface, and in the automatic mode, the control unit automatically calculates tariff information and the time slab by analyzing the historical data when no communication exists between the power grid and the control unit. The utility interface module receives the tariff information through the data line and passes the information to the control unit. When there is no historical data present and no communication with the utility the system shifts back to the time driven mode and imitates the user about the selected mode.

The line interface having drivers measures (209) the load on each lines and send the measured load information to the data analyzer. The storage interface module measures (210) the storage back up time for the system and send the storage back up time information to the data analyzer. The utility interface module signals to the data analyzer about the availability of utility power (211) from the utility power source. The data analyzer receives the load information, the storage backup time information and the availability of the utility power source for analyzing the data with respect to the user inputs. If there is no availability of utility power source, the control unit commands to turn down the non critical lines and wait (212) till the power availability from the utility power source and run the critical lines through the power from the storage unit.

The utility interface module receives the time slab information such as off-peak period, peak period and shoulder period from the utility power grid and sends the received information to the data analyzer. The data analyzer checks (213) the current time slab for the system and proceed to perform the control operation. In off peak period (214) the system allows to charge the storage unit and allows to run all the appliances lines in the system. In the peak period (215) the control system shut off the non critical load and shift al the possible lines to the storage unit. Further the data analyzer receives the charge level in the storage unit and shifts the line back to the power grid utility line if the charge level is critical in the storage unit. In shoulder period (216) the system checks for the next time slab, whether peak period or off peak period. If the next time slab is arrived as peak period, the control unit charges the storage unit until it gets fully charged, if the next time slab is off peak period, the control unit drive the lines from the charge available in the storage unit.

The event manager parallelly receives (217) all the measured values, user inputs, time slab information and the data analyzed and the event manger categorize (218) all the received information (219) such as storage level critical, power off from grid, user has changed settings, change in time slab and grid update. The event manger notifies (220) the user about the changes in the system. The event manager stores (221) all the events in the database provided with the control system.

The control unit (109) commands with respect to the selected mode, tariff opted and user input commands, and signals the storage unit to get charged from the input source or to supply power to the all lines or to the selected lines from the storage unit. The data analyzer (110) identifies the mode selected in the control unit to perform the control operation. The control unit (109), during the time when energy prices are less, signals to charge the storage unit (108) and supplies power to all appliances through the grid input source (102) and during the time when energy prices are more signals to shut off the non critical loads and allows utilizing the charged power from storage unit (108) to the critical lines (106).

The control unit (109) receives the time slab information from the utility source (102) and the selected mode from the user interface (103), and identifies the time slab where the electric price rate is in between the peak time and off-peak time, and signals to charge or discharge the storage unit (108) based on the next time slab, available charge in the storage unit and the load condition in the lines.

The control unit (109), during the off peak hour, signals to charge the storage unit and supplies power to all appliances through the grid input source (102) and during peak hours, signals to shut off the non critical loads and allows to utilize the charge in the storage unit (108) to the selected critical lines (106).

The system according to the present invention is configured such that in time driven mode, time slab information is entered by user input, in supply driven mode, time slab information is maintained based on the grid input, and in automatic mode, the time slab information is made by dynamically reading the tariff information from the power grid when there is communication between the power grid and system.

The data analyzer (110) calculates the average power consumption and forecasts the electricity bill in the electrical system. The data analyzer (110) also derives the optimum number of storage units (108) and their supply power level, optimum time to charge the storage unit (108), optimum loads to be put on configured lines, time to turn off non-critical loads. This data is necessary when there is communication failure from the utility source to the system.

The data analyzer is configured to derive the load as following, $$\text{Optimum Load} = \frac{(\text{Storage Unit Size} \times \text{Storage Unit Voltage Level})}{(\text{Back up time} \times \text{Constant})}$$

The above mentioned constant depends on the inverter and storage efficiency, and generally varies from 1 to 1.5.

A method for managing energy consumption is also provided. The method involves receiving power from the utility source (102) and supplying power through distribution lines (106) and charging a storage unit (108) through the power received from the source (102) and supplying power to the required lines (106) as communicated. The system is configured with a control unit (109) having a data analyzer (110) and the database (111), to receive inputs on multiple modes such as time driven mode, supply driven mode and automatic mode and receiving the time slab information such as peak period, off period and shoulder period from the utility source (101) through the utility interface module (101). The mode selected in the user interface (103) and the time slab information from the utility source (102) is identified for signaling through said control unit (109) to charge or discharge the storage unit (108) based on the mode selected, next time slab, and available charge in the storage unit (108) and the load condition in the distribution lines (106).

The energy consumption management system is configured for line level scheduling and turning off the non critical loads during the time when energy prices are high. During peak time the non-critical loads are turned off by cutting the power supply to the non critical line. The electricity bill and consumption is calculated by analyzing the electricity consumption patterns.

The energy management system according to the present invention dynamically switches the power supplies during different time slabs and the tariff opted, thus efficiently controlling the energy consumption and minimizing the electricity bill. The present invention provides an improved energy consumption pattern without change in the actual appliance usage and leverages the application off-peak rates.

The foregoing description is a specific embodiment of the present invention. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

I claim:

1. A system for managing energy consumption comprising:
   a utility interface module configured for receiving power from a power grid and supplying power to distribution lines associated with the system;
   a storage unit charged from the power grid and in electronic communication with the distribution lines for supplying power to the distribution lines;
   a user interface module for receiving user inputs; and,
   a control unit in operative communication with the utility interface module, the storage unit, and the user interface module, said control unit configured for:
   receiving inputs through the user interface module to operate in one of a plurality of operational modes, based on the manner in which tariff information, including tariffs in the form of rates for peak period, off-peak period and shoulder period time slabs, is obtained, and, signaling said storage unit: a) to charge from said power grid, or, b) to supply power to the distribution lines from said storage unit;
   during the time when said tariffs are below a predetermined rate, signaling to charge the storage unit and supplying power to said distribution lines through said power grid; and, during the time when said tariffs are at least at said predetermined rate, signaling to shut off power transmission through said utility interface module to selected distribution lines and utilize the charge from said storage unit to supply power said selected distribution lines; and,
   continuously receiving information that the time slab is one of peak period, off-peak period and shoulder period, from the power grid through the utility interface module, and signaling to control power distribution of the storage unit based on: 1) a subsequent time slab after the current time slab, 2) available charge in the storage unit, and, 3) the load condition in the distribution lines.

2. The system of claim 1, wherein the plurality of operational modes includes a time driven mode and a supply driven mode, and in the time driven mode, the control unit reads the tariff information entered by the user through the user interface, and in the supply driven mode, the control unit reads the tariff information provided from the power grid.

3. The system of claim 2, wherein the plurality of operational modes includes an automatic mode, and in the automatic mode, the control unit dynamically reads the tariff information from the power grid when there is communication between the power grid and the control unit.

4. The system of claim 3, additionally comprising a database in operative communication with the control unit, and wherein in the automatic mode, said control unit automatically calculates the tariff information by analyzing the historical data in the database, when communication does not exist between the power grid and the control unit.

5. The system of claim 4, wherein when the historical data is not present in the database and the control unit is not in communication with the power grid, the control unit shifts to the time driven mode.

6. The system of claim 1, additionally comprising a storage interface module for measuring electrical parameters of the storage unit, and wherein said control unit obtains the power tariff information from the power grid and transfers data between the control unit, storage interface module, user interface module, and the database.

7. The system of claim 1, wherein during the off peak period, said control unit, signals to charge the storage unit and the distribution lines are powered through the power grid.

8. The system of claim 1, wherein the distribution lines include critical and non-critical lines, and during the peak period, said control unit signals to shut off the non critical lines and shift all of the distribution lines to be powered by the storage unit, and, signals to shift the distribution lines back to the power grid when the charge in the storage unit is below a predetermined threshold.

9. The system of claim 1, wherein during the shoulder period, said control unit signals the utility interface module to: 1) charge the storage unit if the subsequent time slab is peak period, and, 2) to drive the distribution lines from the charge in the storage unit, if the subsequent time slab is off-peak period.

10. The system of claim 8, wherein said control unit is further configured for line level scheduling and causing turning off of the non-critical distribution lines during the time when said tariffs are at least at the predetermined rate.

11. The system of claim 8, wherein said critical distribution lines drive light loads and heavy loads.

12. The system of claim 1, additionally comprising an event manager in operative communication with the control unit, the event manager configured for registering the events and communicating said events to users.

13. A method for managing energy consumption comprising:
receiving power from a utility source;
supplying the received power through distribution lines;
charging a storage unit through the power received from the utility source;
supplying power to the distribution lines;
configuring an energy consumption management system including a control unit configured to receive inputs to operate in one of a plurality of operational modes, based on the manner in which tariff information of rates for peak period, off-peak period, and shoulder period time slabs is obtained;
receiving information that the time slab information is one of peak period, off peak period and shoulder period, from the utility source, through a utility interface module;
identifying: 1) the operational mode selected by a user and input into a user interface module, and, 2) the current time slab from the utility source; and,
signaling through said control unit to charge or discharge the storage unit based on the mode selected, the subsequent time slab, available charge in the storage unit, and the load condition in the distribution lines.

14. The method of claim 13, additionally comprising: establishing communication between the control unit, the storage unit, user input devices and a database.

15. The method of claim 13, additionally comprising: calculating electricity charges by analyzing consumption patterns based on the charge in the storage unit and the load conditions in the distribution lines.

16. The method of claim 15, wherein the electricity charges are in the form of a payable invoice.

17. The method of claim 13, wherein the subsequent time slab includes the next time slab.

18. The method of claim 14, wherein the operational mode includes:
a time driven mode where the tariff information is provided by a user to the user interface module;
a supply driven mode where the tariff information is provided by a utility to the user interface module; and,
an automatic mode where either: 1) the tariff information is provided by a utility to the user interface module; or, 2) if the tariff information is not available from the utility, the tariff is obtained from historical tariff data from the database and provided to the user interface module.

19. The method of claim 13, wherein the utility source includes at least one of a power grid and an alternate power source.

20. The system of claim 9, wherein the subsequent time slab includes the next time slab.

* * * * *